United States Patent
Guerinot et al.

(10) Patent No.: US 12,179,933 B1
(45) Date of Patent: Dec. 31, 2024

(54) ELECTROMECHANICALLY CONTROLLED AIRCRAFT POWER TRANSMISSION SYSTEM

(71) Applicant: HONEYWELL INTERNATIONAL INC., Charlotte, NC (US)

(72) Inventors: Alexandre Guerinot, Phoenix, AZ (US); Jude Miller, Phoenix, AZ (US); Nicholas Hemans, Phoenix, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 18/532,222

(22) Filed: Dec. 7, 2023

Related U.S. Application Data (60) Provisional application No. 63/508,406, filed on Jun. 15, 2023.

(51) Int. Cl.
*B64D 35/02* (2024.01)
*B64D 35/025* (2024.01)

(52) U.S. Cl.
CPC ................... *B64D 35/025* (2024.01)

(58) Field of Classification Search
CPC .......... B64D 27/33; F16H 3/724; B64C 27/08
See application file for complete search history.

(56) References Cited

U.S. PATENT DOCUMENTS

| | | | |
|---|---|---|---|
| 11,313,282 B2 | 4/2022 | Maljean | |
| 11,591,971 B2 | 2/2023 | Garabello et al. | |
| 11,745,888 B2 | 9/2023 | Harvey et al. | |
| 11,746,727 B2 | 9/2023 | Tasker et al. | |
| 2014/0010652 A1 | 1/2014 | Suntharalingam et al. | |
| 2017/0175856 A1 | 6/2017 | Beddok et al. | |
| 2020/0095930 A1 | 3/2020 | Blumer et al. | |
| 2020/0158213 A1* | 5/2020 | Leque | F02C 7/32 |
| 2023/0133871 A1 | 5/2023 | Levisse et al. | |

FOREIGN PATENT DOCUMENTS

| | | |
|---|---|---|
| CN | 106184779 A | 12/2016 |
| DE | 102013209538 B4 | 12/2020 |
| EP | 2618023 A2 | 7/2013 |
| JP | 2022075536 A * | 5/2022 |

OTHER PUBLICATIONS

JP 2022075536 A (Year: 2022).*

* cited by examiner

*Primary Examiner* — Derek D Knight
(74) *Attorney, Agent, or Firm* — Lorenz & Kopf LLP (57) ABSTRACT

An electromechanically controlled aircraft power transmission system includes a first planetary gear set, a first gas turbine engine, a first electric machine, a second planetary gear set, a second gas turbine engine, a second electric machine, a propulsor shaft, and at least one propulsor. The first gas turbine engine is coupled to the first planetary gear set. The first electric machine is coupled to the first planetary gear set and is configured vary the gear ratio of the first planetary gear set. The second gas turbine engine is coupled to the second planetary gear set. The second electric machine is coupled to the second planetary gear set and is configured to vary the gear ratio of the second planetary gear set. The propulsor shaft is coupled to the first and second planetary gear sets and the at least one propulsor is coupled to the propulsor shaft.

13 Claims, 10 Drawing Sheets

ELECTROMECHANICALLY CONTROLLED AIRCRAFT POWER TRANSMISSION SYSTEM

CROSS REFERENCE TO RELATED APPLICATION

The present application claims benefit of prior filed U.S. Provisional Patent Application No. 63/508,406, filed Jun. 15, 2023, which is hereby incorporated by reference herein in its entirety.

TECHNICAL FIELD

The present disclosure relates to aircraft power transmission systems, and more particularly relates to an electromechanically controlled aircraft power transmission system.

BACKGROUND

Growing global environmental concerns, translating into new customer requirements and government regulations, are motivating the transportation industry in general, and the aerospace industry in particular, to consider alternatives to fossil-fuel-burning powertrains to power their vehicles. Consequently, airframers are aggressively turning to hybrid electric powertrain systems to capture higher system efficiencies, where all-electric solutions are not yet viable.

Hybrid electric powertrain systems can be attractive for several reasons. For example, these systems readily facilitate power distribution to multiple electric propulsors from one or several power sources, thereby eliminating the traditional shafting and gearbox of the mechanically driven propulsors alternatives. These systems can provide a convenient way to operate propulsors (driven by regulated electrical motors) as required by aircraft thrust demands for each mission segment independently of the power sources (e.g., diesel generator or turbogenerator), which can then be operated at their most efficient speed. Additionally, these systems offer architecture options that enable powertrain optimizing around a wide range of power.

Initially, smaller vehicles, where power requirements are more approachable for these new technologies, were the object of focus for powertrain hybridization. However, the trend is progressively extending toward vehicles with larger power needs. Unfortunately, the above-mentioned powertrain hybridization benefits can be negated for high power applications. This is due, at least in part, to added system complexity, added system weight, added system losses associated with power conversion from thermo-mechanical, to electrical (AC to DC, power transmission & distribution), back to mechanical (DC to AC, motor-driven propulsor), and significant thermal management challenges. In many instances, these effects preclude a feasible vehicle design.

Hence, there is a need for a relatively simpler, more efficient, and lighter weight powertrain hybridization solution for aircraft, which can simultaneously provide the known benefits of hybrid electric powertrain. The present invention addresses at least this need.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

The present disclosure augments a mechanical power transmission system with electrically modulated gear ratio, enabled by planetary gear sets. In the various disclosed embodiments, power is primarily transmitted by shafts and distributed to propulsors via gearboxes, as needed. The disclosed configurations are most appropriate where power source(s) and propulsor(s) placement lends itself to minimize shaft length (i.e. weight) and where propulsor thrust is varied by speed rather than pitch control.

In one embodiment, an electromechanically controlled aircraft power transmission system includes a first planetary gear set, a first gas turbine engine, a first electric machine, a second planetary gear set, a second gas turbine engine, a second electric machine, a propulsor shaft, and at least one propulsor. The first planetary gear set has a gear ratio that is variable. The first gas turbine engine has a first output shaft coupled to the first planetary gear set. The first electric machine is coupled to the first planetary gear set and is configured to rotate at a rotational speed, and the rotational speed of the first electric machine is used to vary the gear ratio of the first planetary gear set. The second planetary gear set has a gear ratio that is variable. The second gas turbine engine has a second output shaft coupled to the second planetary gear set. The second electric machine is coupled to the second planetary gear set and is configured to rotate at a rotational speed, and the rotational speed of the second electric machine is used to vary the gear ratio of the second planetary gear set. The propulsor shaft is coupled to the first and second planetary gear sets and the at least one propulsor is coupled to the propulsor shaft.

In another embodiment, an electromechanically controlled aircraft power transmission system includes a first planetary gear set, a first gas turbine engine, a first electric machine, a second planetary gear set, a second gas turbine engine, a second electric machine, a propulsor shaft, at least one propulsor, and control logic. The first planetary gear set has a gear ratio that is variable. The first gas turbine engine has a first output shaft coupled to the first planetary gear set. The first electric machine is coupled to the first planetary gear set and is configured to rotate at a rotational speed, and the rotational speed of the first electric machine is used to vary the gear ratio of the first planetary gear set. The second planetary gear set has a gear ratio that is variable. The second gas turbine engine has a second output shaft coupled to the second planetary gear set. The second electric machine is coupled to the second planetary gear set and is configured to rotate at a rotational speed, and the rotational speed of the second electric machine is used to vary the gear ratio of the second planetary gear set. The propulsor shaft is coupled to the first and second planetary gear sets and the at least one propulsor is coupled to the propulsor shaft. The control logic is in operable communication with at least the first and second electric machines and the first and second gas turbine engines. The control logic is configured to selectively control the operation of the system in at least a start mode, a low-power mode, an intermediate-power mode, and a high-power mode In yet another embodiment, an electromechanically controlled aircraft power transmission system includes a planetary gear set, a gas turbine engine, and an electric machine. The planetary gear set has a gear ratio that is variable. The gas turbine engine has an output shaft coupled to the planetary gear set. The electric machine is coupled to the planetary gear set and is configured to rotate at a rotational speed, and the rotational speed of the electric machine is used to vary the gear ratio of the planetary gear set.

Furthermore, other desirable features and characteristics of the digital surface position sensor will become apparent from the subsequent detailed description and the appended claims, taken in conjunction with the accompanying drawings and the preceding background.

BRIEF DESCRIPTION OF DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
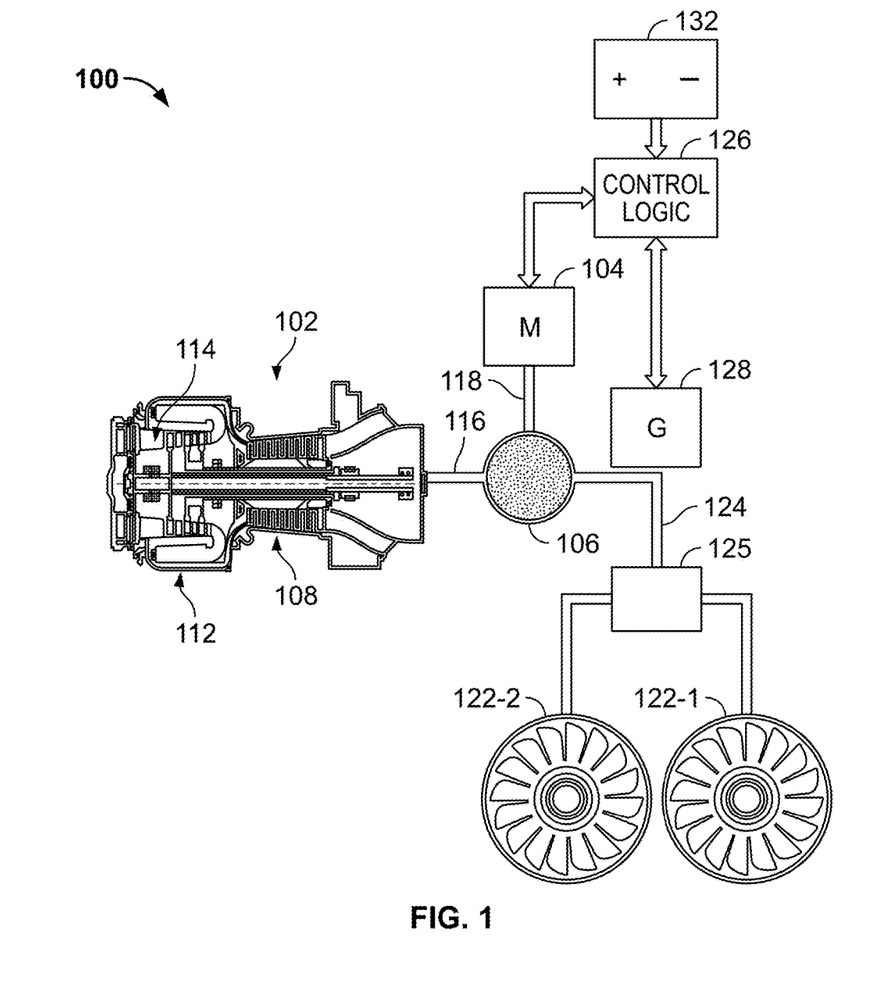
FIG. 1 depicts a schematic representation of one embodiment of an electromechanically controlled aircraft power transmission system.

Referring to FIG. 1, a schematic representation of one embodiment of an electromechanically controlled aircraft power transmission system 100 is depicted and includes at least a gas turbine engine 102, an electric machine 104, and a planetary gear set 106. The gas turbine engine 102 may implemented using any one of numerous known gas turbine engine configurations. In the depicted embodiment, the gas turbine engine includes at least a compressor section 108, a combustion section 112, and a turbine section 114.

During operation, the compressor section 108 draws in ambient air, compresses the air with one or more compressors, and supplies the compressed air to the combustion section 112. In addition to receiving the compressed air, the combustion section 112 receives fuel via a non-illustrated fuel injection assembly, mixes the fuel with the compressed air, ignites the mixture, and supplies the high energy combustion gases to the turbine section 114. In the turbine section 114, the high-energy combustion gases drive one or more turbines, which supply a drive torque to the one or more compressors and to a turbine output shaft 116.

The electric machine 104 may be implemented using any one of numerous types of AC or DC electric machines, and it may be configured as either a motor or a motor-generator. When it is configured as a motor, the electric machine 104 is configured, when electrically energized, to convert electrical power into a rotational drive torque. The rotational drive torque is supplied to an electric machine shaft 118. When the electric machine 104 is configured as a motor-generator, it may be controlled to operate in a plurality of different operational modes. Specifically, it may be controlled to operate in a motor mode, in which it converts electrical power into rotational torque, and in a generator mode, in which it converts rotational torque into electrical power.

Figure 2:
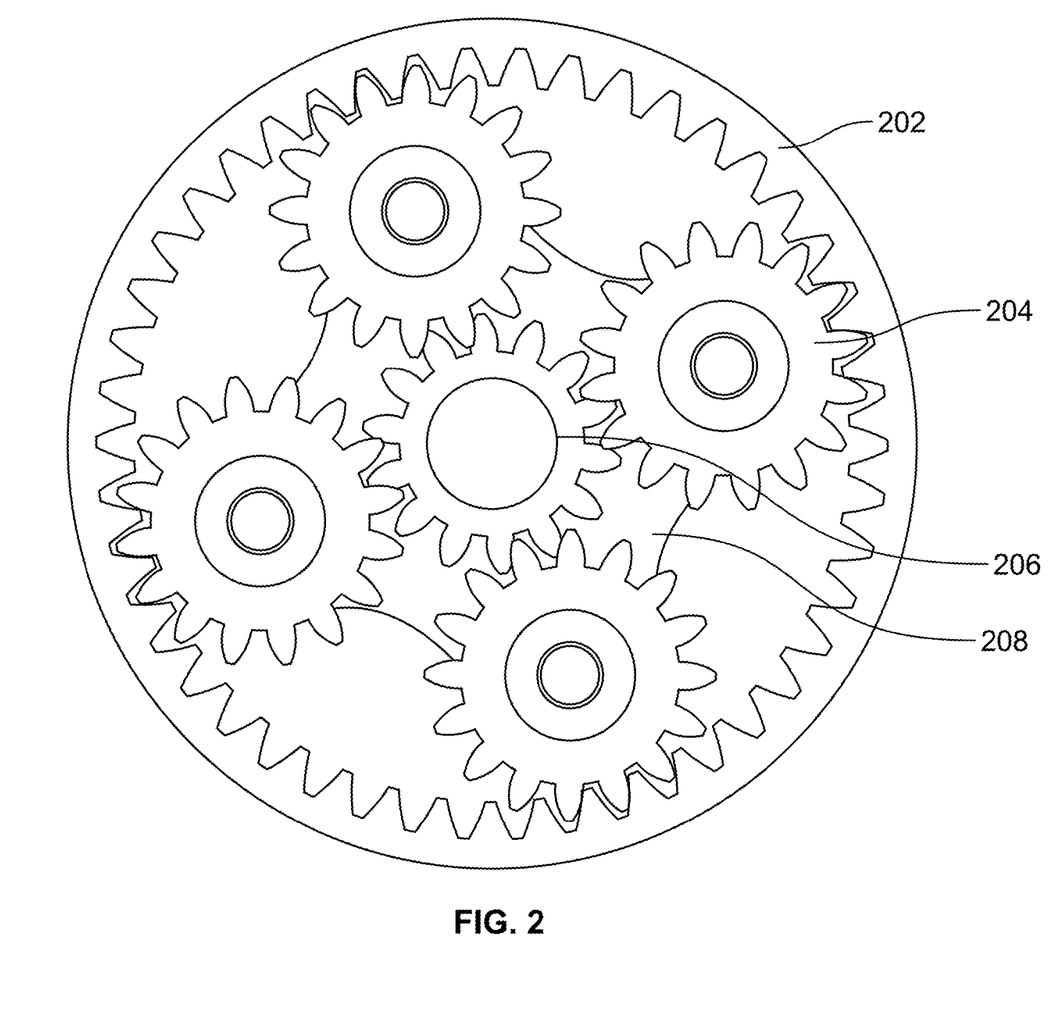
FIG. 2 depicts one embodiment of a planetary gear set that may be used in the system of FIG. 1.
Figure 3:
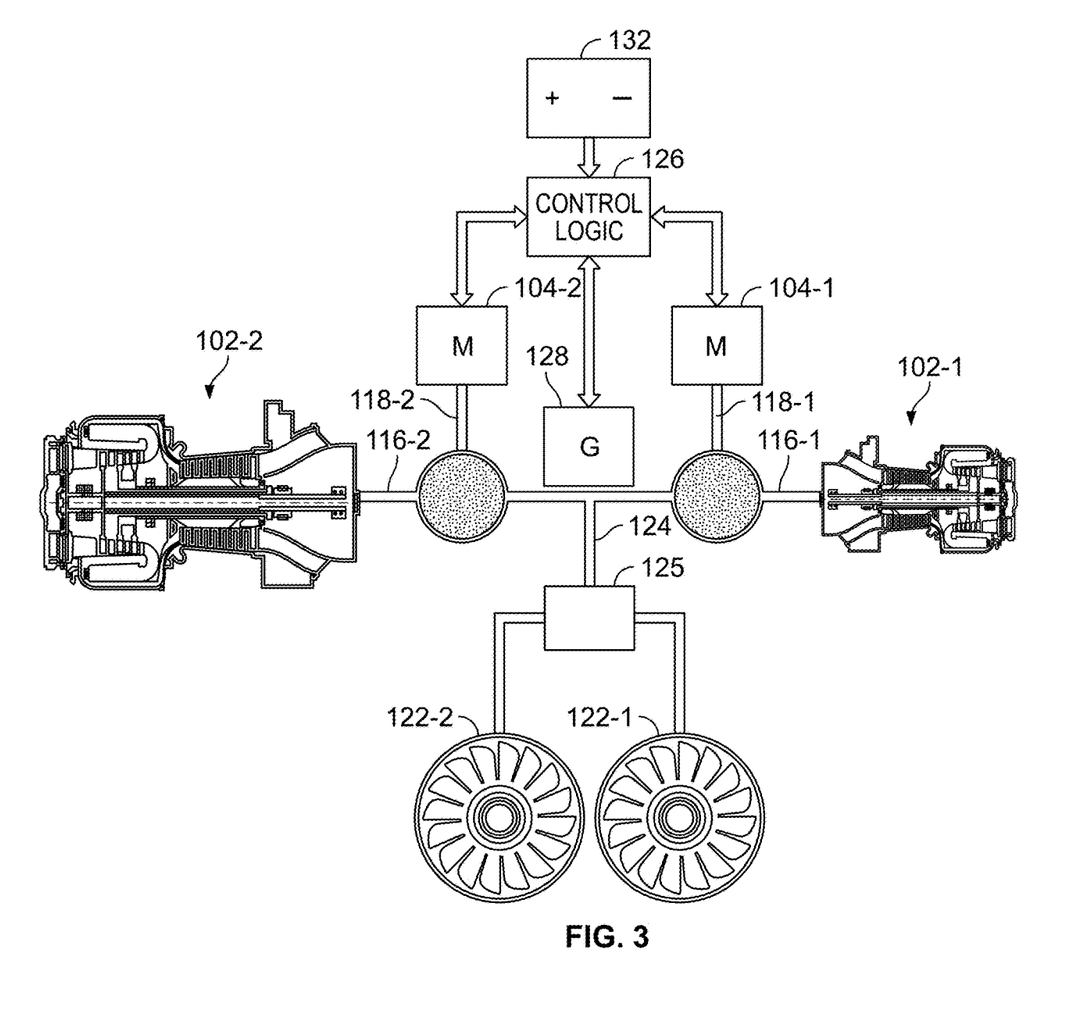
FIGS. 3-6 depict schematic representations of various other embodiments of an electromechanically controlled aircraft power transmission system.
Figure 4:
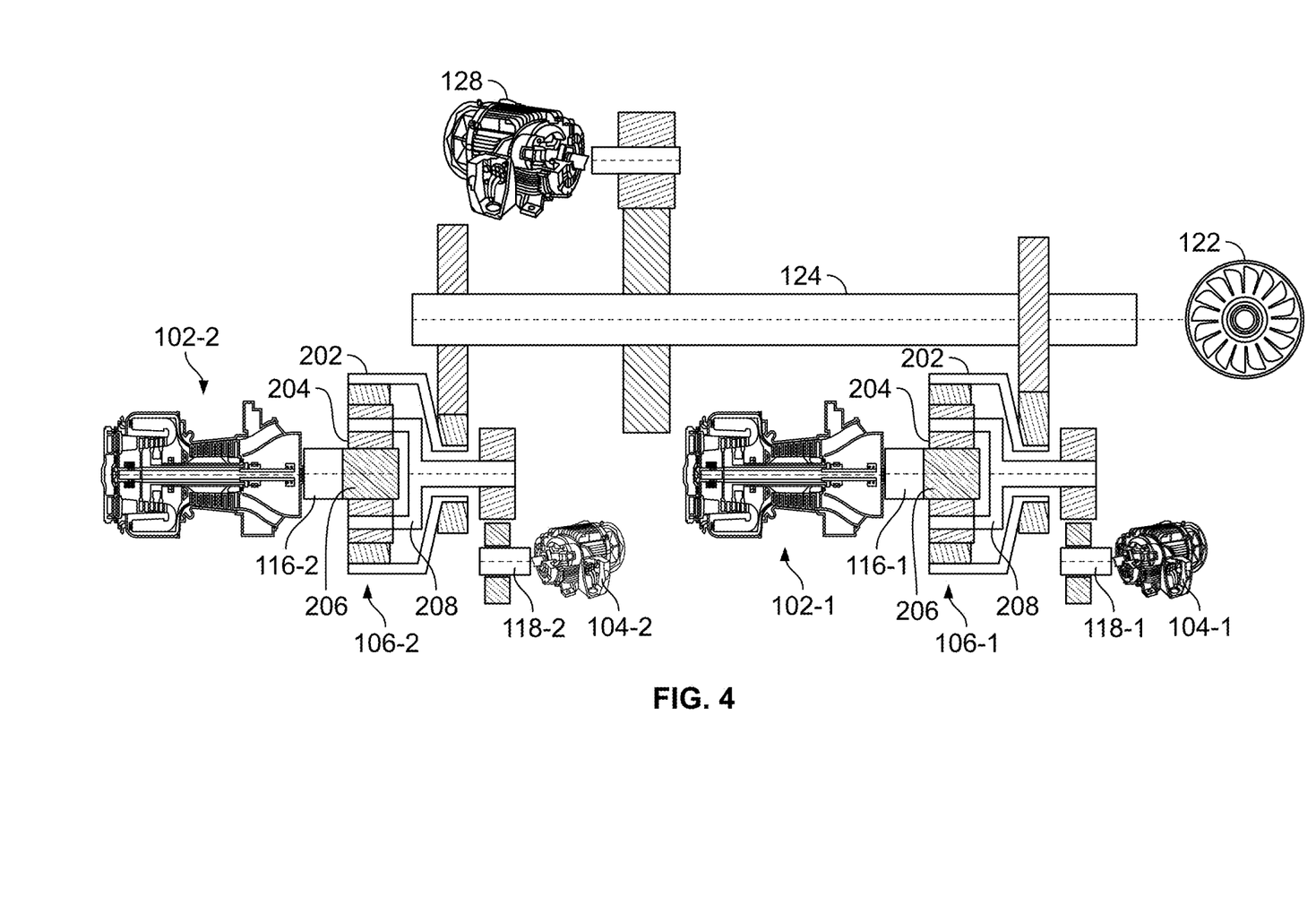
Figure 5:
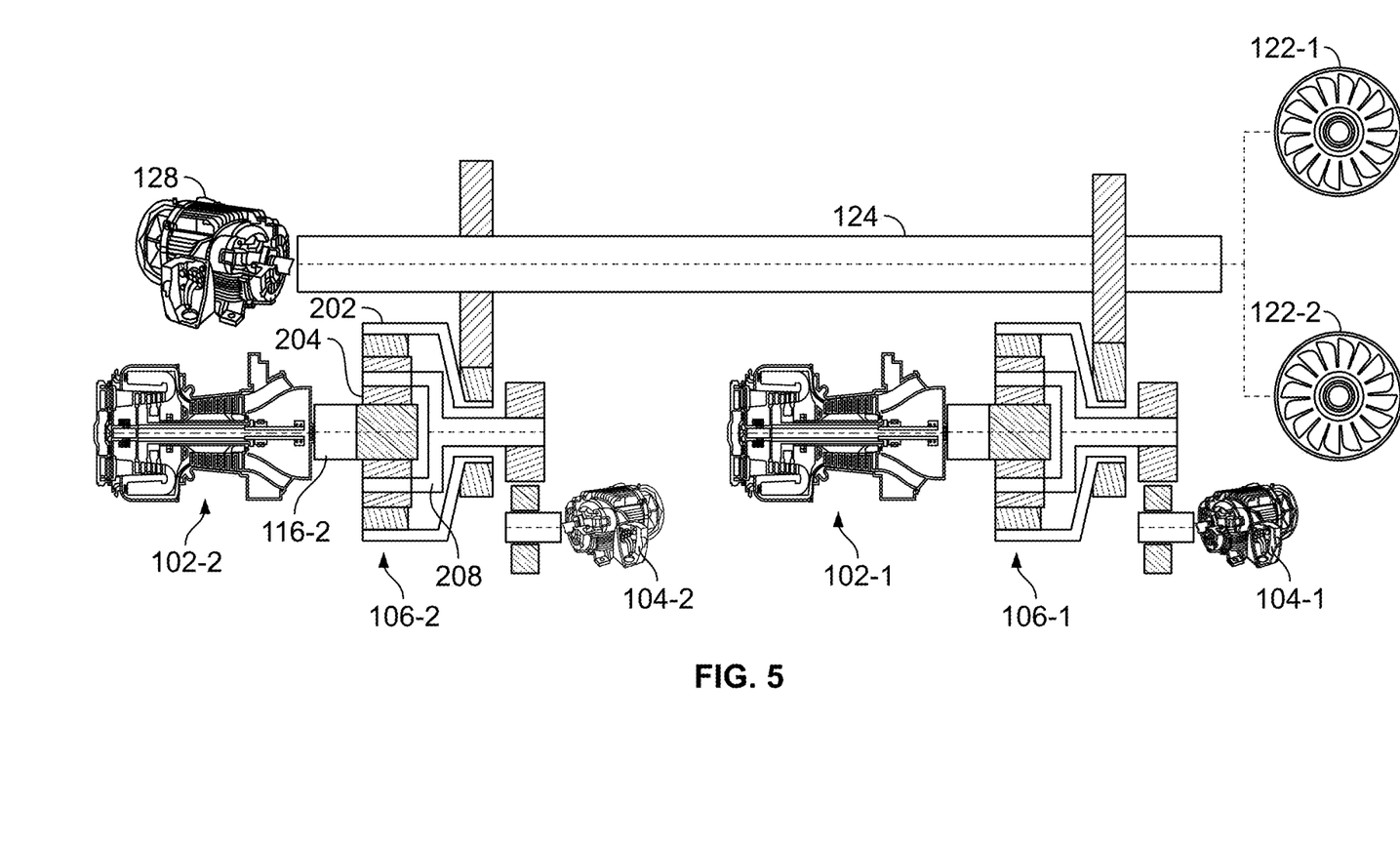

The planetary gear set 106 is coupled to the gas turbine engine 102, to the electric machine 104, and to one or more aircraft propulsors 122. More specifically, the planetary gear set 106 is coupled to the gas turbine engine 102 via the turbine output shaft 116, to the electric machine 104 via the electric machine shaft 118, and to the one or more propulsors 122 via a propulsor shaft 124 and, at least in the depicted embodiment, a gearbox 125. The planetary gear set 106 is configured to implement a gear ratio that is variable and, as is generally known and as is depicted in FIG. 2, includes a ring gear 202, a plurality of planet gears 204, a sun gear 206, and a planet gear carrier 208. As is also known, each of the planet gears 204 independently meshes with the ring gear 202 and with the sun gear 206, and each planet gear 204 is rotationally coupled to the planet gear carrier 208. In the example embodiment depicted in FIG. 2, the planetary gear set 106 includes four planet gears 204. It will be appreciated that this is merely exemplary, and that the planetary gear set 106 could be implemented with more or less than this number of planet gears 204.

Before proceeding further, it is noted that the one or more aircraft propulsors 122 may be implemented using any one of numerous known propulsors that include a plurality of rotor blades for providing thrust and/or lift. While the depicted embodiment includes two aircraft propulsors 122 (e.g., 122-1, 122-2), the system 100 could be implemented with more or less than this number. The gearbox 125, when included, is preferably implemented using a distribution gearbox, which is configured to transmit the torque supplied from a single source (i.e., the planetary gear set 106) to multiple loads (i.e., the aircraft propulsors 122).

Figure 6:
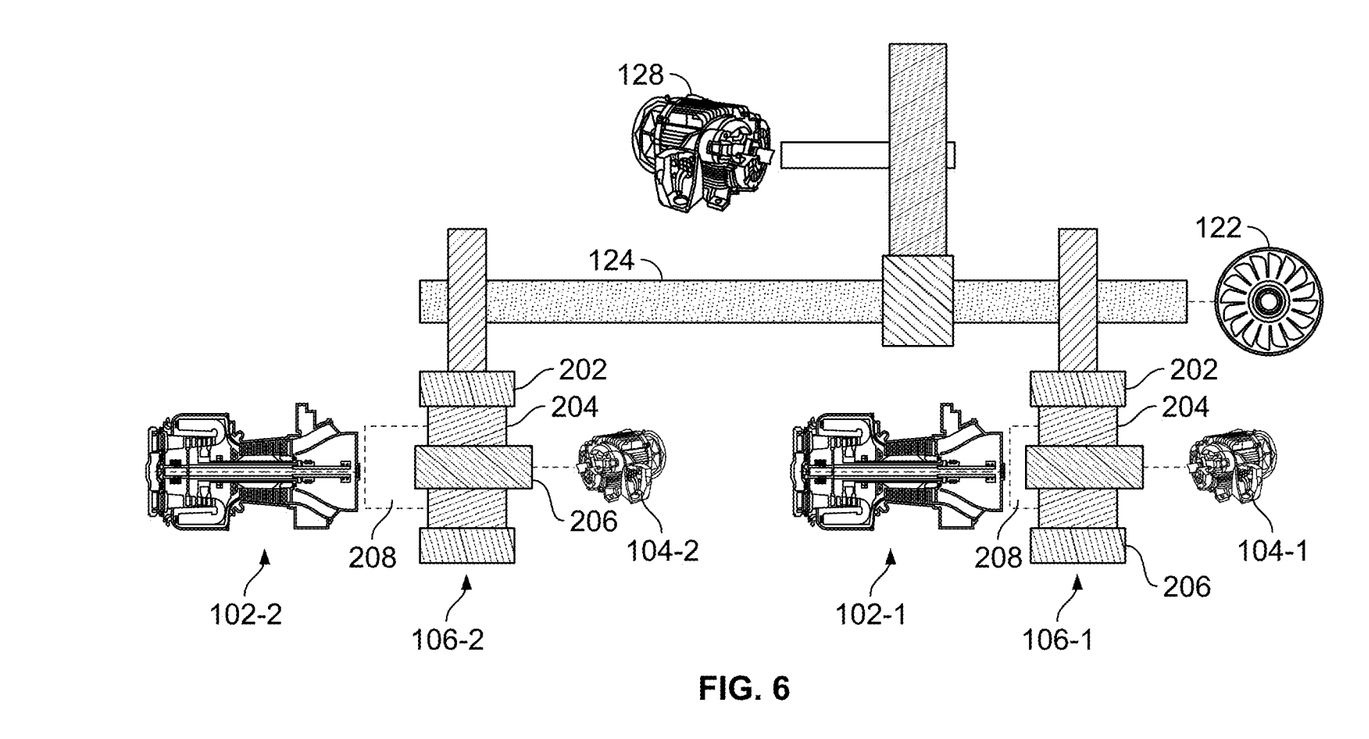

In one particular embodiment, the sun gear 204 is coupled to the turbine output shaft 116, the planet gear carrier 208 is coupled to the electric machine 104, and the ring gear 202 is coupled to the aircraft propulsors 122 via the gearbox 124. Thus, by varying the speed of the electric machine 104, the gear ratio between the turbine output shaft 116 and the aircraft propulsors 122 is varied. In this regard, the speed of the electric machine 104 can be controlled to set propulsor thrust according to vehicle demand while the gas turbine engine 102 is operated at its most efficient speed. In other embodiments, such as the one depicted in FIG. 6, the sun gear 204 is coupled to the electric machine 104, the planet gear carrier 208 is coupled to the turbine output shaft 116, and the ring gear 202 is coupled to the aircraft propulsors 122 via the gearbox 124.

As FIG. 1 also depicts, the system 100 additionally includes control logic 126, a generator 128, and a battery 132. The control logic 126, which may be implemented as part of an aircraft or engine control system (e.g., a FADEC), is configured to control the rotational speed of the electric machine 104 to thereby control propulsor thrust.

The generator 128, which may be implemented using any one of numerous known generator configurations, is coupled to receive an input drive torque and is configured, upon receipt of the input drive torque, to generator electrical power. Although only a single generator 128 is depicted in FIG. 1, it will be appreciated that more than one generator 128 could be included. Moreover, though not depicted in FIG. 1, the generator 128 may receive the input drive torque, either directly or indirectly, from the gas turbine engine 102 or the propulsor shaft 124, and it is usually (though not necessarily) operable during in-flight operations. The generator 128 may provide power to the control logic 126 and/or motor(s) 104, and it may also be used to supply electrical power to various other non-illustrated aircraft loads.

The battery 132, which may be implemented using any one of numerous known batteries, is electrically coupled to the control logic 126, and is configured to selectively receive electrical power from the generator 128 and/or supply electrical power to the electric machine 104. Preferably, the system 100 is configured, via the control logic 126, such that the battery 132 only supplies electrical power during startup of the gas turbine engine 102, as described further below.

Turning now to FIGS. 3-6, various other embodiments of the system 100 are depicted. In each of these embodiments, the system 100 is implemented using a plurality of gas turbine engines 102. For clarity and ease of depiction and description, only two gas turbine engines 102 (102-1, 102-2) are shown. It will be appreciated that in other embodiments, the system 200 could include more than two gas turbine engines 102. In any case, as FIGS. 3-6 depict, each gas turbine engine 102 supplies a drive torque, independently of each other, to a common propulsor shaft 124, via respective planetary gear sets 106-1, 106-2. The system 200 additionally includes a plurality of electric machines 104 (104-1, 104-2), each of which is coupled to a respective gear set 106-1, 106-2, to thereby vary the gear ratio between the turbine output shafts 116-1, 116-2 and the propulsor shaft 124.

As may be appreciated, with the embodiments depicted in FIGS. 3-6, each gas turbine engine 102 can contribute power to the system 100 at its most efficient speed, for maximum system efficiency. Moreover, each gas turbine engine 102 can be shut down, for a power saving mode, without affecting the other engine(s) 102 or the propulsor shaft 124. It should additionally be noted that preferably, though not necessarily, in the embodiments depicted in FIGS. 3-6, and as is shown most clearly in FIG. 3, one gas turbine engine 102-1 may be smaller (i.e., configured to generate less output torque) than the other gas turbine engine 102-2. In this manner, the system 100 can be operated in different modes. These modes, which will now be described, include an engine start mode, a low-power mode, an intermediate-power mode, and a high-power mode.

Figure 7:
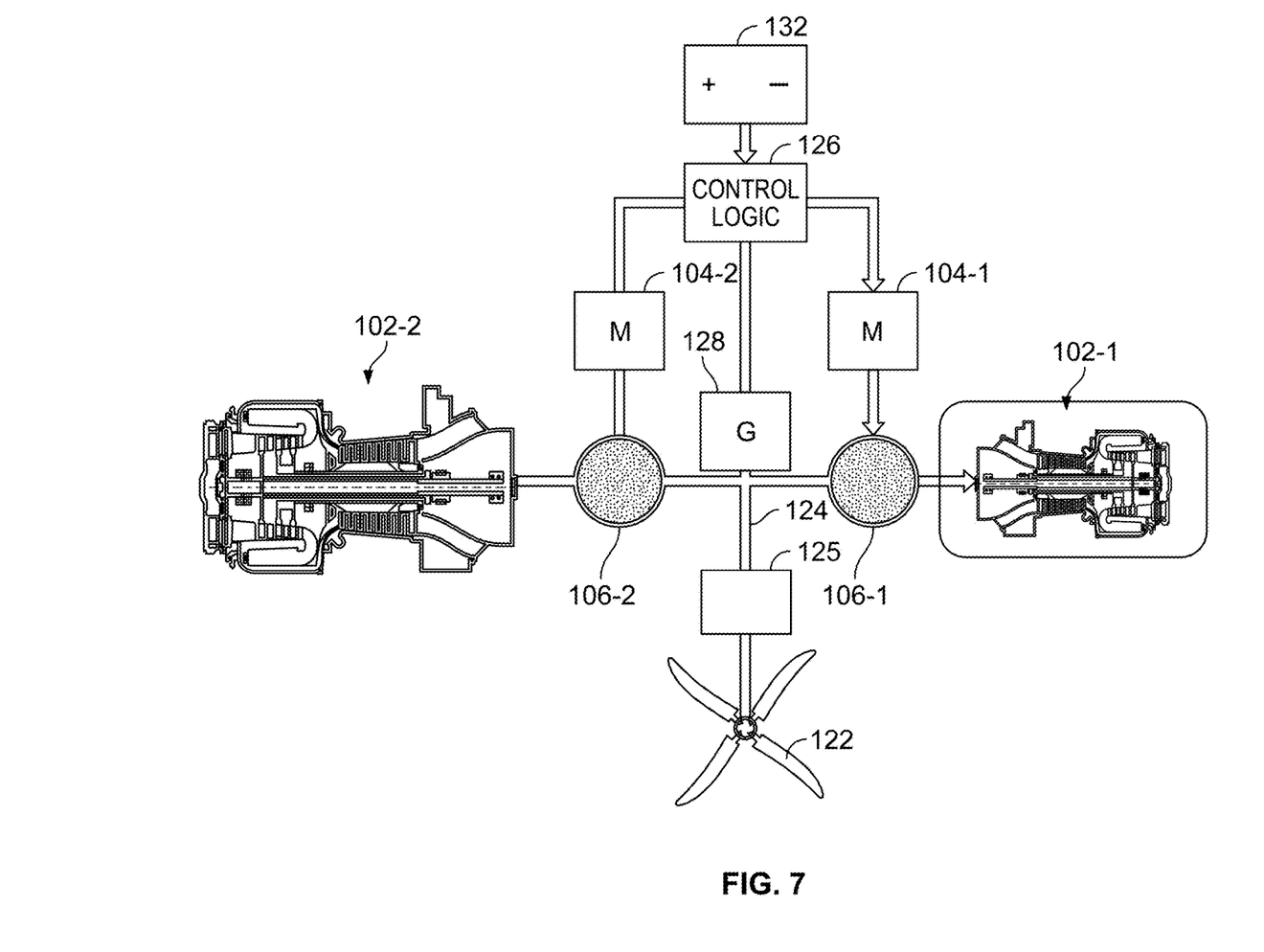
FIGS. 7-10 depict schematic representations of the embodiments of FIGS. 3-6 in various operational modes.
Figure 8:
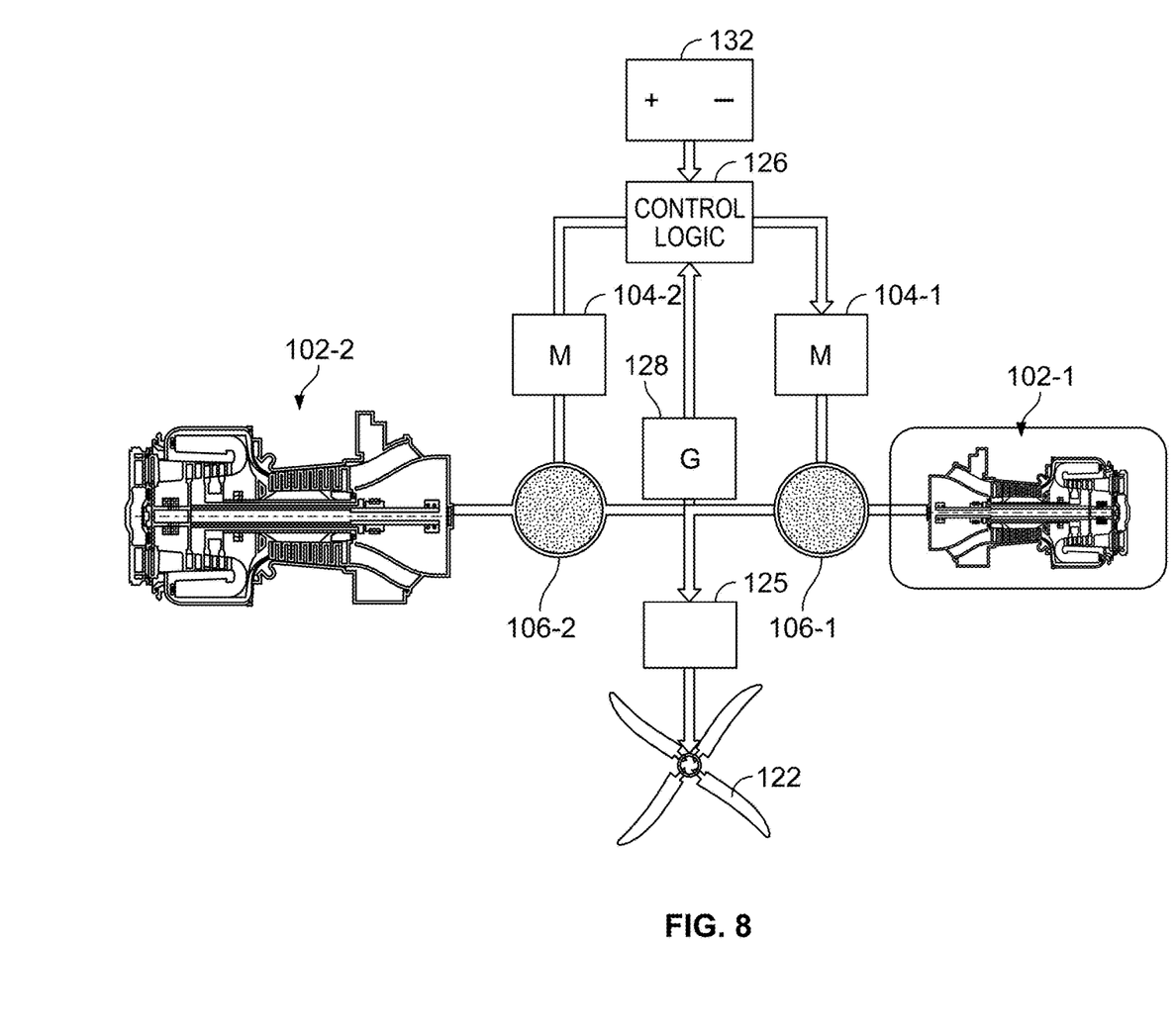

In the engine start mode, which is shown in FIG. 7, the propulsor shaft 124 is locked and the battery 132 is used to electrically energize the electric machine 104-1. The drive torque from the electric machine 104-1 is supplied, via the planetary gear set 106-1, to the smaller gas turbine engine 102-1, until the smaller gas turbine engine 102-1 starts. When only the smaller gas turbine engine 102 is started, the control logic 126 may shift the system 100 to operate in the low-power mode, which is depicted in FIG. 8. In the low-power mode, which may be used for low power mission segments, the generator 128 may be used to supply electrical power to the system 100. Also, the propulsor shaft 124 is no longer locked, and the smaller gas turbine engine 102-1 is used to supply torque to the propulsor(s) 122.

Figure 9:
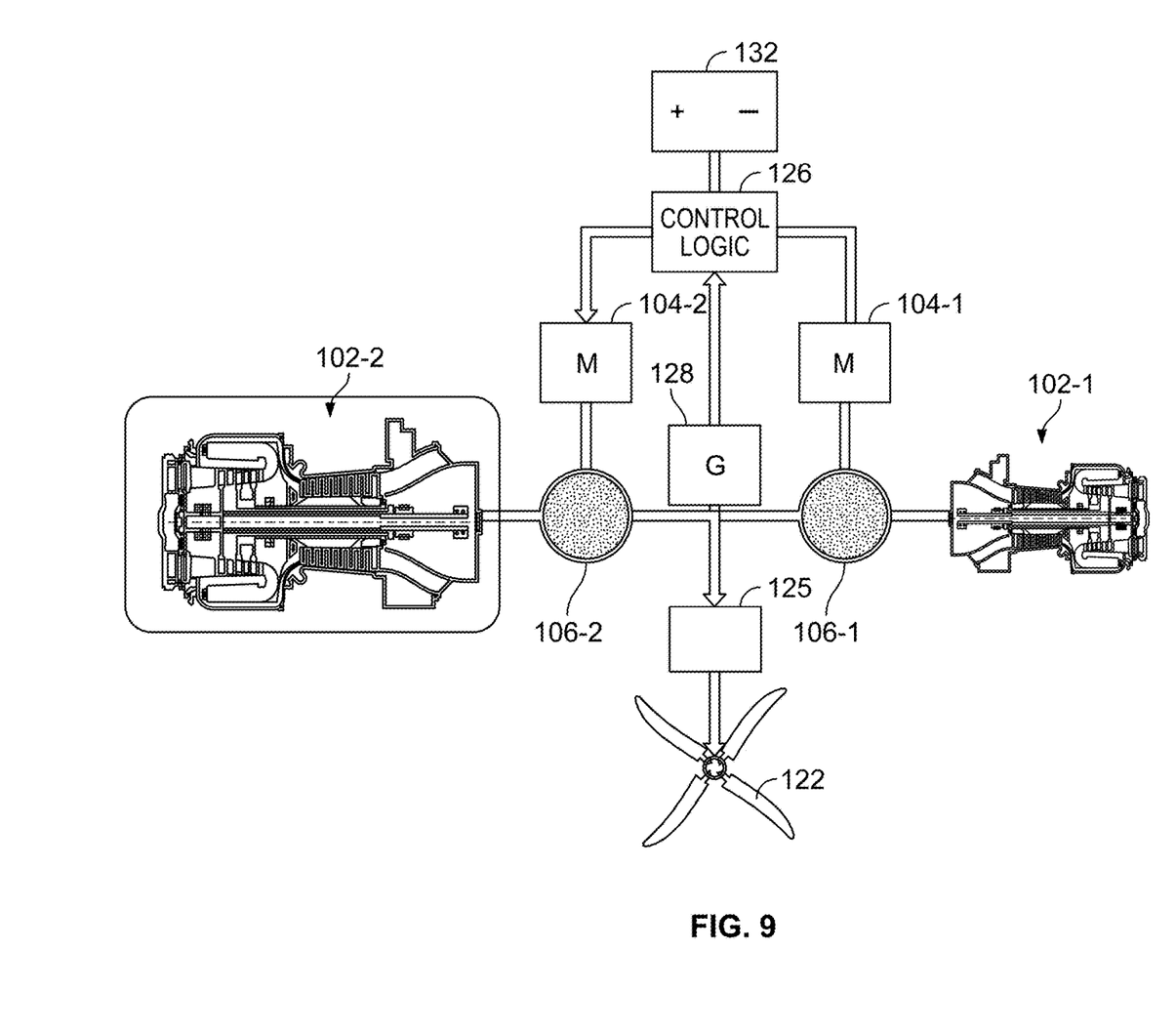
Figure 10:
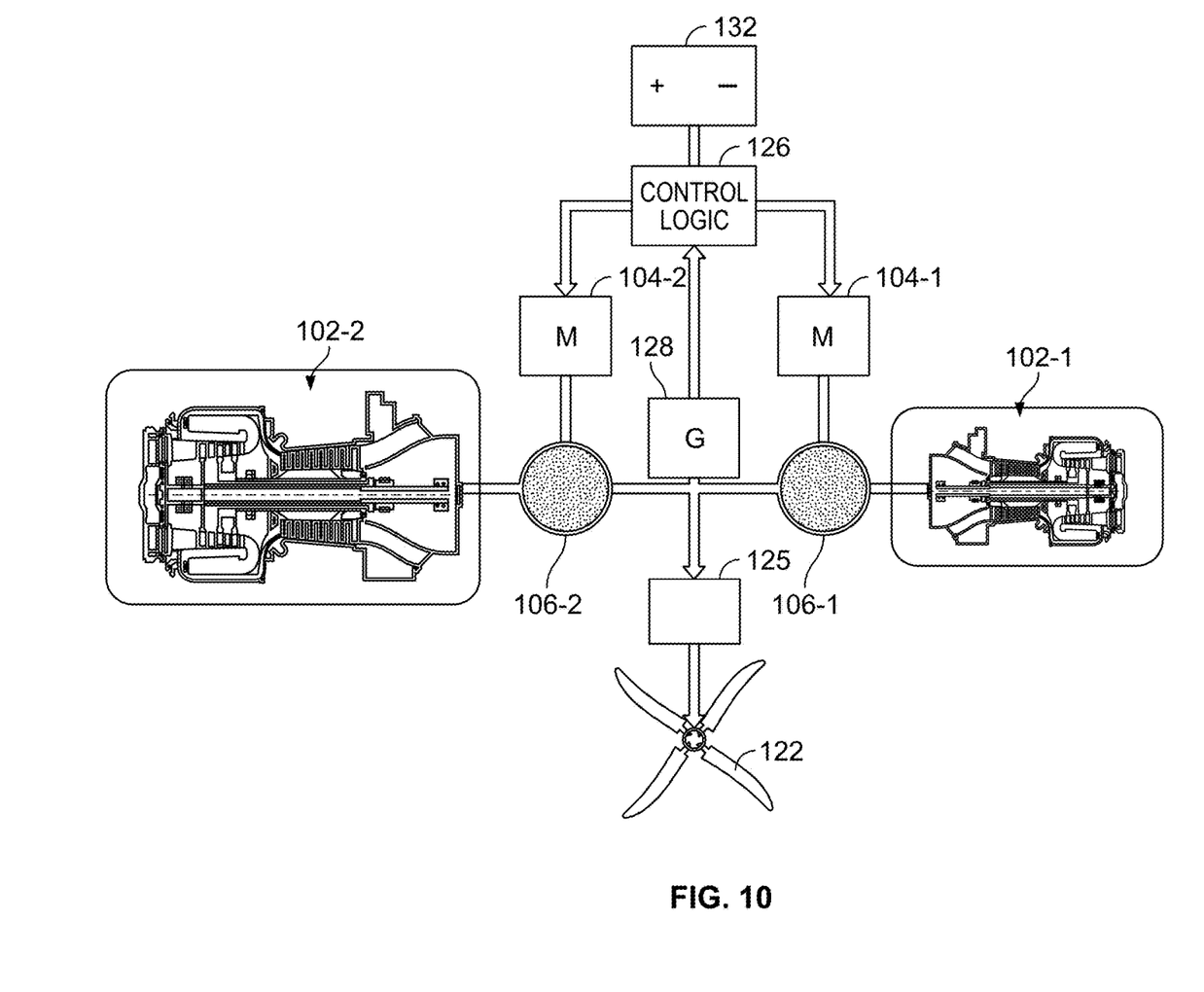

In the intermediate-power mode, which may be used for intermediate power mission segments, the larger gas turbine engine 102-2 has been started. As FIG. 9 depicts, in this mode the generator 128 may supply electrical power to the system 100, the propulsor shaft 124 is not locked, and the larger gas turbine engine 102-2 is used to supply torque to the propulsor(s) 122. In the high-power mode, which may be used for take-off/climb mission segments, the smaller and larger gas turbine engines 102-1, 102-2 are both operating. As FIG. 10 depicts, in this mode the generator 128 may supply electrical power to the system 100, the propulsor shaft 124 is not locked, and both the smaller and the larger gas turbine engines 102-1, 102-2 are used to supply torque to the propulsor(s) 122.

The embodiments described herein are each implemented using one or more gas turbine engines 102. It will be appreciated, however, that system 100 can also be implemented using one or more thermomechanical and electrical power sources.

The systems described herein provide various advantages over a functionally equivalent hybrid electric powertrain. These advantages include (1) minimized losses due to power conversion, (2) minimized heat rejection and TMS size, (3) minimized quantity and size of electrical machines (generators, motors, inverters, and the like), and (4) coupling of multiple power sources (with or without similar optimum rpm). Another benefit is the ability to elegantly couple single-spool and multi-spool engines.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An electromechanically controlled aircraft power transmission system, comprising:
   a first planetary gear set having a gear ratio that is variable;
   a first gas turbine engine having a first output shaft coupled to the first planetary gear set;
   a first electric machine coupled to the first planetary gear set and configured to rotate at a rotational speed, the rotational speed of the first electric machine being used to vary the gear ratio of the first planetary gear set;

a second planetary gear set having a gear ratio that is variable;
a second gas turbine engine having second output shaft coupled to the second planetary gear set;
a second electric machine coupled to the second planetary gear set and configured to rotate at a rotational speed, the rotational speed of the second electric machine being used to vary the gear ratio of the second planetary gear set;
a propulsor shaft coupled to the first and second planetary gear sets; and
at least one propulsor coupled to the propulsor shaft.

2. The system of claim 1, further comprising a distribution gearbox coupled between the propulsor shaft and the at least one propulsor.

3. The system of claim 2, wherein:
the first and second planetary gears each comprise a first and second ring gear, a plurality of first and second planet gears, a first and second sun gear, and a first and second planet gear carrier, respectively;
the first and second sun gears are coupled to the first and second output shaft of the first and second gas turbine engines, respectively;
the first and second planet gear carriers are coupled to the first and second electric machines, respectively; and
the first and second ring gears are coupled to the at least one propulsor via the distribution gearbox.

4. The system of claim 2, wherein:
the first and second planetary gears each comprise a first and second ring gear, a plurality of first and second planet gears, a first and second sun gear, and a first and second planet gear carrier, respectively;
the first and second sun gears are coupled to the first and second electric machines, respectively;
the first and second planet gear carriers are coupled to the first and second output shafts of the first and second gas turbine engines, respectively; and
the first and second ring gears are coupled to the at least one propulsor via the distribution gearbox.

5. The system of claim 1, further comprising:
control logic in operable communication with, and configured to control the rotational speed of, the first and second electric machines.

6. The system of claim 1, wherein the electric machine comprises a motor.

7. The system of claim 1, wherein the electric machine comprises a motor-generator.

8. An electromechanically controlled aircraft power transmission system, comprising:
a first planetary gear set having a gear ratio that is variable;
a first gas turbine engine having a first output shaft coupled to the first planetary gear set;
a first electric machine coupled to the first planetary gear set and configured to rotate at a rotational speed, the rotational speed of the first electric machine being used to vary the gear ratio of the first planetary gear set;
a second planetary gear set having a gear ratio that is variable;
a second gas turbine engine having second output shaft coupled to the second planetary gear set;
a second electric machine coupled to the second planetary gear set and configured to rotate at a rotational speed, the rotational speed of the second electric machine being used to vary the gear ratio of the second planetary gear set;
a propulsor shaft coupled to the first and second planetary gear sets;
at least one propulsor coupled to the propulsor shaft; and
control logic in operable communication with at least the first and second electric machines and the first and second gas turbine engines, the control logic configured to selectively control operation of the system in at least a start mode, a low-power mode, an intermediate-power mode, and a high-power mode.

9. The system of claim 8, wherein:
the system further comprises a battery; and
the control logic, when controlling the operation of the system in the start mode, receives electrical power from the battery and controls the first electric machine to supply a drive torque to the first gas turbine engine, via the first planetary gear set, until the first gas turbine engine starts.

10. The system of claim 8, wherein:
the first gas turbine engine is configured to generate less output torque than the second gas turbine engine;
the system further comprises a generator; and
the control logic, when controlling the operation of the system in the low-power mode, receives electrical power from the generator and controls at least the rotational speed of the first electric machine.

11. The system of claim 10, wherein the control logic, when controlling the operation of the system in the intermediate-power mode, receives electrical power from the generator and controls at least the rotational speed of the second electric machine.

12. The system of claim 10, wherein the control logic, when controlling the operation of the system in the high-power mode, receives electrical power from the generator and controls at least the rotational speeds of the first and second electric machines.

13. An electromechanically controlled aircraft power transmission system, comprising:
a first planetary gear set having a gear ratio that is variable;
a first gas turbine engine having a first output shaft coupled to the first planetary gear set; and
a first electric machine coupled to the first planetary gear set and configured to rotate at a rotational speed, the rotational speed of the electric machine being used to vary the gear ratio of the first planetary gear set;
a second planetary gear set having a gear ratio that is variable;
a second gas turbine engine having a second output shaft coupled to the second planetary gear set; and
a second electric machine coupled to the second planetary gear set and configured to rotate at a rotational speed, the rotational speed of the second electric machine being used to vary the gear ratio of the second planetary gear set.

* * * * *